United States Patent
Gallagher

(10) Patent No.: US 7,426,917 B1
(45) Date of Patent: Sep. 23, 2008

(54) SYSTEM AND METHOD FOR CONTROLLING LOCOMOTIVE SMOKE EMISSIONS AND NOISE DURING A TRANSIENT OPERATION

(75) Inventor: Shawn Michael Gallagher, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/696,312

(22) Filed: Apr. 4, 2007

(51) Int. Cl.
- *F02B 3/12* (2006.01)
- *F02M 63/00* (2006.01)
- *F02M 51/00* (2006.01)

(52) U.S. Cl. ............... 123/299; 123/447; 123/492

(58) Field of Classification Search ............ 123/299, 123/357, 446, 447, 478, 480, 492, 493, 501, 123/502

See application file for complete search history.

(56) References Cited

U.S. PATENT DOCUMENTS

| | | | |
|---|---|---|---|
| 4,142,497 A | 3/1979 | Long | |
| 4,674,448 A | 6/1987 | Steiger | |
| 4,989,568 A | 2/1991 | Sougawa | |
| 5,197,438 A | 3/1993 | Kumano et al. | |
| 5,201,294 A | 4/1993 | Osuka | |
| 5,230,613 A | 7/1993 | Hilsbos et al. | |
| 5,277,156 A | 1/1994 | Osuka et al. | |
| 5,313,924 A | 5/1994 | Regueiro | |
| 5,365,902 A | 11/1994 | Hsu | |
| 5,394,851 A | 3/1995 | Cryer et al. | |
| 5,433,182 A | 7/1995 | Augustin et al. | |
| 5,492,099 A | 2/1996 | Maddock | |
| 5,605,134 A | 2/1997 | Martin | |
| 5,697,341 A | 12/1997 | Ausman et al. | |
| 5,975,056 A | 11/1999 | Augustin et al. | |
| 6,000,380 A | 12/1999 | Weisbarth | |
| 6,016,791 A | 1/2000 | Thomas et al. | |
| 6,192,863 B1 | 2/2001 | Takase | |
| 6,325,050 B1 | 12/2001 | Gallagher et al. | |
| 6,341,596 B1 | 1/2002 | Dillen et al. | |
| 6,349,706 B1 | 2/2002 | Hsu et al. | |
| 6,357,421 B1 | 3/2002 | Pritchard | |

(Continued)

OTHER PUBLICATIONS

Automotive Equipment: Diesel injection technology. Common rail from Bosch for vehicles used in the construction industry and in agriculture. http://www.bosch-presse.de.

*Primary Examiner*—Willis R Wolfe, Jr.
(74) *Attorney, Agent, or Firm*—Robert Wawrzyn, Esq.; Robert L. Wolter, Esq.; Beusse Wolter Sanks Mora & Maire, P.A.

(57) ABSTRACT

A system and/or method of controlling smoke or noise emanating from a diesel engine wherein a throttle is drivingly coupled to the diesel engine, and wherein an operator of the engine changes a throttle position. The system may comprise a high pressure fuel pump in fluid communication with a fuel reservoir, a fuel accumulator, in fluid communication with the high pressure fuel pump, one or more injectors that are in fluid communication with the fuel accumulator and each of the fuel injectors. A main controller transmits a signal in response to a change in the throttle position. A fuel injection controller, in electrical communication with the main controller, in response to one or more signals relative to a transient operation, transmits one or more signals relative to fuel injection parameters of a fuel injection made during the transient operation.

28 Claims, 2 Drawing Sheets

U.S. PATENT DOCUMENTS

| | | |
|---|---|---|
| 6,382,177 B1 * | 5/2002 | Saito .................... 123/299 |
| 6,429,540 B1 | 8/2002 | Dunsworth et al. |
| 6,450,146 B1 | 9/2002 | Dickerson et al. |
| 6,584,953 B2 | 7/2003 | Yomogida |
| 6,601,564 B2 | 8/2003 | Davey |
| 6,647,938 B2 | 11/2003 | Gaessler et al. |
| 6,712,045 B1 | 3/2004 | McCarthy, Jr. |
| 6,823,844 B2 | 11/2004 | Steinbrenner et al. |
| 6,848,414 B2 | 2/2005 | West et al. |
| 6,848,426 B2 | 2/2005 | Kumar et al. |
| 6,892,701 B2 | 5/2005 | Dillen et al. |
| 6,932,583 B2 | 8/2005 | Niethammer |
| 6,968,830 B2 | 11/2005 | Glenn et al. |
| 7,047,938 B2 | 5/2006 | Flynn et al. |
| 2004/0245410 A1 | 12/2004 | Kisak et al. |
| 2007/0012294 A1 | 1/2007 | Casablanca et al. |

* cited by examiner

SYSTEM AND METHOD FOR CONTROLLING LOCOMOTIVE SMOKE EMISSIONS AND NOISE DURING A TRANSIENT OPERATION

BACKGROUND OF THE INVENTION

The present invention is directed in general to an apparatus and method for decreasing the locomotive smoke emissions and engine noise when the operator advances the locomotive throttle position, and more specifically to an apparatus and method that adjusts the fuel injection pressure and/or number of injections made during a transient event or operation.

Recent amendments to the United States environmental statutes and regulations require lowering of the permitted emissions from locomotive diesel engines, including visible smoke. One such requirement is the reduction in $NO_x$ emissions, which can be effected by retarding the fuel injection timing of a locomotive diesel engine. But this timing modification negatively impacts fuel consumption and, therefore, it is desirable to increase the engine compression ratio to gain back some of the fuel composition losses.

However, increasing the compression ratio also increases the visible smoke emissions at partial engine loading. The problem of visible smoke is especially acute during transient load and speed changes, i.e., when the locomotive operator advances the throttle (i.e., moves the throttle to a higher notch position) to call for higher speed and/or greater load pulling capacity (i.e., locomotive horsepower). A locomotive typically has 8 discrete notch settings called "notches".

Smoke emissions tend to be worse when the throttle is advanced to higher throttle positions when starting from lower positions. Excessive smoke during a transient has been addressed in the past with managing the rate that the load is applied, resulting in slower load application. Such a system and method are disclosed in U.S. Pat. No. 6,892,701. In addition, injection timing may be changed during a transient to help reduce smoke. Such as system and method is disclosed in U.S. Pat. No. 6,341,596.

Currently, fuel systems on locomotives that incorporate unit pump systems are not capable of varying the fuel pressure. In this type of system, the injection event is dependant directly upon the amount of pressure in the high-pressure line. Therefore, the unit pump system has control only over the timing of the injection, or when the injection is made relative to the top dead center position of the piston. Moreover, the injection pressure cannot be varied for a fixed speed and horsepower of the locomotive.

Other fuel systems such as the common rail fuel systems allow for more flexibility in developing fuel injection strategies. The injection event (or opening of the needle valve in the injector) is controlled by an electronic control unit (controller) and solenoid, and is not dependant on pressure in the high-pressure fuel lines leading to the injector. Such advanced fuel systems allow for fuel injection to take place at any time during the piston cycle and allow for multiple injections during a single cycle. In addition, the injection pressure is variable relative to the speed of the vehicle. A common rail fuel system for a locomotive engine is disclosed in a commonly United States published patent application, Pub. No. 20070012294.

BRIEF DESCRIPTION OF THE INVENTION

In general, an embodiment of the present invention comprises a system for controlling locomotive smoke emissions and noise during transient operation wherein the locomotive comprises a throttle drivingly coupled to a diesel engine, and wherein an operator of the locomotive changes a throttle position as required during operation of the locomotive. The system may incorporate a high-pressure fuel system that can change fuel pressure, and/or the number of injections in an engine cycle, within the system independent of other injection parameters or variables. The locomotive has a locomotive controller for generating and sending a signal in response to a change in the throttle position, and one or more fuel pressure sensors for detecting a fuel pressure within the accumulator and sending the one or more signals relative such fuel pressure. In addition a fuel injection controller is in communication with the locomotive controller, the fuel pressure sensors, the one or more of the fuel injectors. The fuel injection controller in response to signals received from the locomotive controller and the fuel pressure sensors generates one or more signals relative to a fuel injection strategy during the transient operation and responsive to which a valve in the injector opens or closes and responsive to which a high pressure fuel pump increases or decreases the pressure level the fuel injection system. In addition, or alternatively, the fuel injection controller may transmit a signal indicative of a plurality of injections in a single engine cycle during the transient operation to reduce the noise emanating from the engine.

In addition, an embodiment for the method allows for monitoring a parameter indicative of an increase in throttle notch setting from an idle setting to a powered notch setting. Data relative to the increase of the notch setting is transmitted to the fuel injector controller. The fuel injector performs a step of transmitting one or commands from the fuel injection controller relative to the pressure level at which fuel is injected into a cylinder during the transient operation from the first notch setting to the second notch setting. In addition, the locomotive may have a global positioning system that transmits data relative to geographical coordinates of the engine in order to identify a geographic area sensitive to noise or with reduced noise requirements, such as a passenger station. If the engine is so located, the fuel injector controller may transmit one or more commands indicative of a plurality of injections to be made in a single engine cycle during the transient operation i.e. when the engine throttle position is changed from idle to a first notch setting.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION OF THE INVENTION

Figure 1:
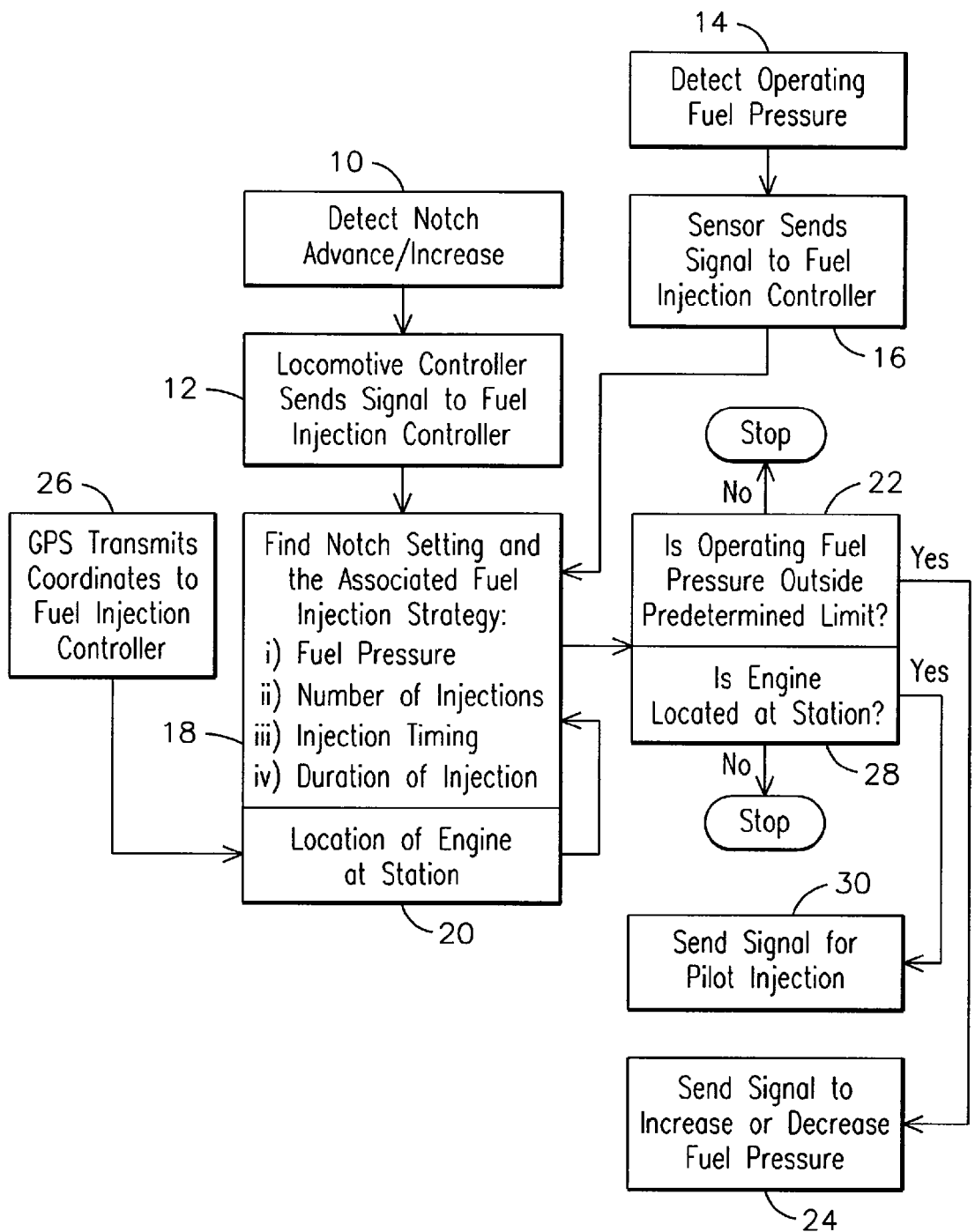
FIG. 1 is a flow chart illustrating the operation of the invention.

Before describing in detail the particular transient smoke reduction system in accordance with the present invention, it should be observed that the present invention resides primarily in a novel combination of steps and apparatus related to smoke reduction in a railroad locomotive. Accordingly, these hardware components and method steps have been represented by conventional elements in the drawings, showing only those specific details that are pertinent to the present invention, so as not to obscure the disclosure with structural details that will be readily apparent to those skilled in the art having the benefit of the description herein.

Though exemplary embodiments of the present invention are described with respect to rail vehicles, specifically locomotives having diesel engines, exemplary embodiments of the invention are also applicable for other uses, such as but not limited to off-highway vehicles, marine vessels, and stationary units, each which may use a diesel engine. Towards this end, when discussing a specified mission, this includes a task or requirement to be performed by the diesel powered system. Therefore, with respect to railway, marine or off-highway vehicle applications this may refer to the movement of the system from a present location to a destination. In the case of stationary applications, such as but not limited to a stationary power generating station or network of power generating stations, a specified mission may refer to an amount of wattage (e.g., MW/hr) or other parameter or requirement to be satisfied by the diesel powered system. Likewise, operating condition of the diesel-fueled power generating unit may include one or more of speed, load, fueling value, timing, etc.

Exemplary embodiments of the invention solves the problems in the art by providing a system, method, and computer implemented method, such as a computer software code, for improving overall fuel efficiency and emissions through optimized power makeup. With respect to locomotives, exemplary embodiments of the present invention are also operable when the locomotive consist is in distributed power operations.

Persons skilled in the art will recognize that an apparatus, such as a data processing system, including a CPU, memory, I/O, program storage, a connecting bus, and other appropriate components, could be programmed or otherwise designed to facilitate the practice of the method of the invention. Such a system would include appropriate program means for executing the method of the invention.

Also, an article of manufacture, such as a pre-recorded disk or other similar computer program product, for use with a data processing system, could include a storage medium and program means recorded thereon for directing the data processing system to facilitate the practice of the method of the invention. Such apparatus and articles of manufacture also fall within the spirit and scope of the invention.

FIG. 1 is a flow chart illustrating the operation of the present invention. At a step 10, the locomotive operator's movement of the throttle handle toward a higher notch position is detected. A transient operational period (or transient event) ensues as the engine and locomotive operational parameters change to those commanded by the new notch position. Locomotives typically have a throttle system that includes eight discrete power settings or notches (N1-N8 plus idle). Each notch represents a commanded engine speed and engine load, where N1 may be a minimum engine speed and load and N8 may be a maximum engine speed and load. In addition, the locomotive has a main controller that monitors and/or identifies each notch under which the locomotive engine is operating including the idle position.

There are several engine and locomotive operational parameters that can be monitored to detect a notch increase, including, for example, engine speed (revolutions per minute), engine acceleration excitation current to the traction alternator, engine horsepower, engine fuel value (the quantity of fuel injected into an engine cylinder), traction motor alternator output current, vehicle speed, and manifold air pressure (which is influenced by the turbine speed and thus the engine speed). In response to one or more of these monitored parameters, at a step 12, the locomotive controller (shown in FIG. 1) determines that a notch change has occurred and sends a representative signal to a fuel injection system controller. The fuel injection controller controls the parameters or variables of a fuel injection. Such parameters may include the timing of an injection made during an injection event, the number of fuel injections made during an injection event, the duration of each fuel injection and the fuel injection pressure.

In step 14 a sensor detects the fuel pressure within the fuel pump or a fuel accumulator (see FIG. 2) of the fuel injection system for the diesel engine; and, with respect to step 16, a signal indicative of the operating fuel pressure is sent to the fuel injection controller.

While the embodiments described include a main controller and a fuel injection controller, a system and method may also integrate the function of the main controller and fuel injection controller into a single controller.

Responsive to the signals received relative to the notch advance and the operating fuel pressure, the fuel injection controller determines what the fuel pressure should be at the detected notch setting in order to achieve a desired smoke emission. For example, at step 18 a look-up table stored in a database of the fuel injection controller may be consulted to determine the appropriate fuel pressure at the detected notch setting. One or more of the notch settings is associated with one or more predetermined fuel pressures or ranges of fuels pressures. At steps 22 and 24, if the operating fuel pressure is not equal to, or does not fall within a given range of fuel pressures that are associated with the detected notch setting a signal is sent to the fuel pump (see FIG. 2) to either decrease or increase the fuel pressure to fall within the selected range of fuel pressures. If operating fuel pressure is equal to a given fuel pressure, or does fall within a range of fuel pressures associated with the detected notch setting a signal is not sent.

Figure 2:
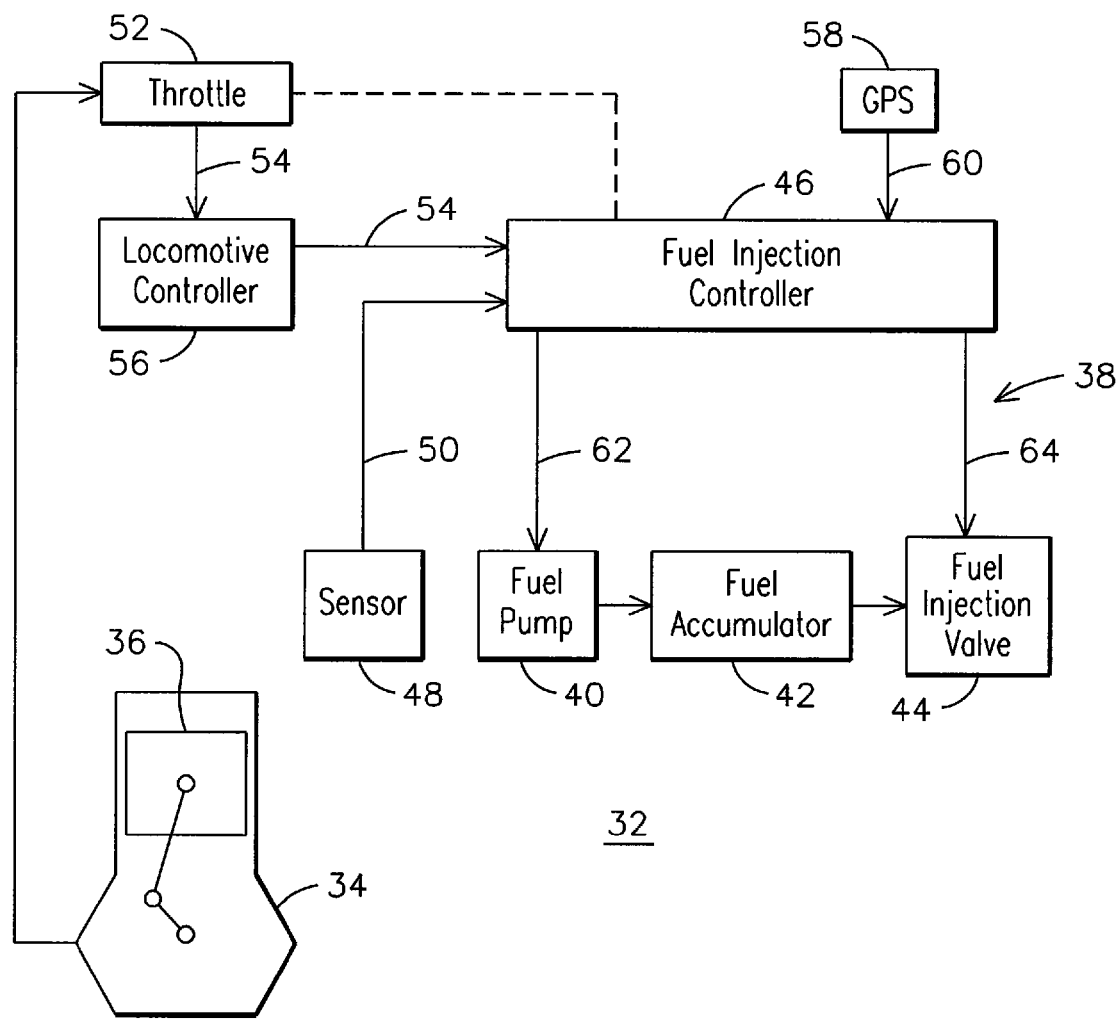
FIG. 2 is a block diagram and schematic of locomotive components associated with the invention.

Upon detection of a transient event, an advanced fuel system such as a common rail fuel system as shown in FIG. 2, can increase fuel pressure at the fuel injection event. The increased injection pressure during a transient event promotes better air-fuel mixing in the cylinder, which results in more complete combustion and reduced smoke output. In contrast to prior art fuel injection systems for locomotives; the fuel injection pressure in the present system and method can be adjusted independent of other fuel injection parameters.

Detection of a transient event such as the advance or increase in notch setting may also be utilized to reduce noise during the transient event. It is known that pilot injections may be used to reduce the noise associated with diesel engines, especially at idling speeds. A pilot injection introduces an amount of fuel prior to a main injection of fuel that smoothes the start of combustion eliminating the high pressure spikes that produce the high noise on diesel engines. The pilot injection results in a smoother combustion cycle and reduces the clatter or noise.

At certain locations where a locomotive idles such as a passenger station, the noise level produced by the locomotive must fall within regulated guidelines. Accordingly, the fuel injection event may be adjusted to reduce noise levels when the locomotive is present at such a location. For example in step 10, if the notch setting is advanced from an idle position to N1, the notch advance signal is sent in step 12 to the fuel injection controller. The signal is indicative of the notch advance from an idle setting to N1. The fuel injection controller is programmed to generate a signal indicative of a fuel injection strategy that includes a pilot injection or multiple fuel injections during a single engine cycle and the transient operation.

In an embodiment, and with respect to step 26 in FIG. 1, the locomotive may have a global positioning system (FIG. 2) that transmits to the fuel injection controller a signal including data relative to geographical coordinates of the engine. The fuel injection controller has a database that contains data including coordinates of one or more geographic area sensitive to noise or with reduced noise requirements, such as a passenger station. In steps 20 and 28, responsive to a signal from the global positioning system, the fuel injection controller determines if the locomotive is located at a passenger station or a location that requires a fuel injection strategy to dampen engine noise. If the locomotive is located at a predetermined location such as a passenger station, in step 30, the controller generates a signal representative of a fuel injection strategy that includes one or more pilot injections. In this manner, the fuel injection system and fuel injection strategy may control the noise output of the engine.

FIG. 2 is a schematic illustration of a diesel engine 32 using diesel or alternate liquid fuels and incorporating a fuel injection control scheme providing enhanced engine performance in varying environmental conditions. Engine 32 is representative of any large, medium-speed, multi-cylinder diesel engine such as may be used in locomotive, marine or power generation applications. Engine 32 includes a plurality of power cylinders 34 (one illustrated) each having a piston 36 reciprocating therein. A fuel injection apparatus 38 injects fuel into the respective cylinders 34 in timed sequence with the reciprocation of the pistons 36. The fuel injection apparatus 38 may be of the common rail fuel system type, or other advanced high pressure fuel system, and includes a fuel pump 40, a fuel accumulator 42 that stores fuel under pressure and a fuel injector 44 associated with each cylinder 34. Each fuel injector 44 preferably includes a valve that opens or closes responsive to commands from a fuel injection controller 46 and/or a solenoid (not shown). A pressure sensor 48 transmits a signal 50 to the fuel injection controller 46, which signal is indicative of a fuel pressure in the accumulator 42 and/or the fuel pump 40.

The engine 32 also includes an engine power and/or throttle position selection and sensing apparatus, collectively referred to herein as throttle 52. The throttle 52 provides a power demand signal 54 that is responsive to an operator throttle input. For locomotive engines, the throttle input will typically include a plurality of discrete throttle settings that are commonly referred to as notches, such as N1 thru N8, and an idle setting. The demand signal 54 may be sent to a locomotive controller 56 or directly to the fuel injection controller 46 as represented by the dashed line.

Responsive to the signal 54 from the locomotive controller 56 or the throttle 52, the fuel injection controller 46 identifies the transient event or the advance from an idle setting to a powered notch setting. In addition, responsive the signal 50 relative to the fuel pressure, the fuel injection controller 46 determines if the fuel pressure falls within predetermined acceptable limits. The fuel injector controller 46 transmits a command signal 62 indicative of a change in fuel pressure and in response to transition in notch settings 54 and the fuel pressure signal 50.

The fuel injection controller 46 also transmits one or command signals 64 to the fuel injector which signal 64 comprises data relative to injection parameters such as fuel injection timing, the number of injections made during an engine cycle and/or the duration. In an embodiment of the invention, a global positioning system 58 transmits a signal 60 to the fuel injection controller 46, which signal 60 includes coordinates of a geographical location of the engine 32. The fuel injection controller 46 may be programmed with a memory or database that includes data relative to one or more geographic locations sensitive to noise or with reduced noise requirements, such as a passenger station. In addition, the database or memory may include predetermined fuel injection parameters associated with the geographic locations. The fuel injection controller 46 transmits a command signal 64 indicative of a fuel injection strategy to reduce noise emanating from the engine 32. More specifically, the injection strategy may include multiple injections during an engine cycle, or pilot injections. In this manner, the fuel injection controller 46, and or global positioning system 58 may more precisely identify when pilot injections may be used to reduce the noise level of the engine 32.

In addition, the embodiment in which detection of a transient event such as changing the notch settings may prompt increasing or decreasing fuel pressure may be incorporated with identifying the location of the engine 32. By way of example, if an engine 32 is located at a passenger station and is idling an operator may adjust the throttle 52 to a powered notch. Responsive to the control signal 54 and the location signal 60, the fuel injection controller 46 generates a signal 62 to increase fuel injection pressure and inject multiple times (pilot injections) during an engine cycle.

While the preferred embodiments of the present invention have been shown and described herein, it will be obvious that such embodiments are provided by way of example only. Numerous variations, changes and substitutions will occur to those of skill in the art without departing from the invention herein. Therefore, it is intended that the invention not be limited to the particular disclosed as the best mode contemplated for carrying out this invention, but that the invention will include all embodiments falling within the scope of the appended claims.

What is claimed is:

1. A system for controlling smoke emissions and noise during a transient operation of a diesel engine, wherein a throttle is drivingly coupled to the diesel engine, and wherein an operator of the engine changes a throttle position as required during operation of the engine, the system comprising:
   a high pressure fuel pump in fluid communication with a fuel reservoir;
   one or more injectors that are in fluid communication with the fuel pump and each of the fuel injectors is in fluid communication with a corresponding cylinder in which a piston is supported and through which fuel is injected responsive to one or more commands; and,
   a controller for generating a signal, in response to a change in the throttle position and relative to fuel injection parameters of a fuel injection made during a transient operation wherein one fuel injection parameter is a pressure level at which fuel is injected into the cylinder from the one or more fuel injectors during a transient operation.

2. The system of claim 1 further comprising one or more pressure sensors that detect an operating fuel pressure in the system and the signal transmitted by the controller relative to the fuel injection parameter comprises a signal responsive to which the high pressure fuel pump increases or decreases the fuel pressure.

3. The system of claim 1 wherein the signal relative to fuel injection parameters comprises a signal responsive to which multiple fuel injections are made during a single engine cycle.

4. The system of claim 1 wherein the engine comprises a plurality of throttle settings wherein each setting is indicative of a predetermined engine speed and engine load, and the transient operation comprises increasing the throttle setting from a first notch to a second notch and the fuel injection parameter signal comprises a signal indicative of an increase in fuel pressure during the transient operation.

5. The system of claim 1 wherein the fuel injection controller comprises a database having data relative to a plurality of predetermined fuel pressure levels and each pressure level is associated with a transient operation.

6. The system of claim 1 wherein the fuel injection controller comprises a database having data relative to predetermined pressure levels or ranges of pressure levels and each pressure level or range of pressure level is associated with an increase in a throttle setting and the fuel injection controller is programmed to compare data relative to a detected operating fuel pressure, and received from the fuel pressure sensor, to the predetermined pressure level or ranges of pressure levels and transmit a signal indicative of an increase in fuel injection pressure associated with the increase in throttle setting.

7. The system of claim 1 wherein the engine is mounted within a locomotive.

8. The system of claim 1 wherein the controller comprises a main controller that generates a signal indicative of a change in throttle position and a fuel injection controller that in response to the signal indicative of the change in throttle position generates the signal relative to parameters of one or more fuel injections made during the transient operation.

9. The system of claim 1 further comprising a fuel accumulator in fluid communication with the fuel pump and the one or more injectors.

10. The system of claim 1 wherein the engine comprises a plurality of throttle settings wherein each setting is indicative of a predetermined engine speed and engine load, and the transient operation comprises increasing the throttle setting from an idle position to a first notch and the fuel injection parameter signal comprises a signal indicative of a plurality of fuel injections during the transient operation to reduce engine noise.

11. The system of claim 10 further comprising means, in communication with the fuel injection controller, for transmitting data relative to geographical coordinates of the engine, and the fuel injection controller has a database have data relative to the geographical coordinates of a passenger station, and the fuel injection controller generates a signal indicative of a plurality of fuel injections in a single engine cycle during the transient operation to reduce engine noise, when the geographical coordinates transmitted to the fuel controller are indicative of a location of a passenger station.

12. A method for controlling diesel smoke emissions and noise during a transient operation of a diesel engine, wherein the engine has a high pressure fuel pump in fluid communication with a fuel reservoir and one or more injectors that are in fluid communication with the fuel pump and each of the fuel injectors is in fluid communication with a corresponding cylinder in which a piston is supported and each inject fuel into a cylinder responsive to one or more commands, and a throttle is drivingly coupled to the diesel engine, and the throttle is movable through discrete throttle notch settings wherein an operator of the engine changes a throttle position as required during operation of the engine, the method comprising:
monitoring a parameter indicative of an increase in throttle notch setting from a first notch setting to a second notch setting;
transmitting data representative of the increase in notch setting from a controller; and,
transmitting one or more commands from the controller relative to a fuel pressure, at which fuel is injected during the transient operation from the first notch setting to the second notch setting.

13. The method of claim 12 wherein the step of transmitting commands from the fuel injection controller comprises the step of transmitting a command indicative of an increasing fuel pressure during the transient operation.

14. The method of claim 12 wherein the step of transmitting commands from the fuel injection controller comprises the step of transmitting a command indicative of increasing the number of fuel injections in an engine cycle during the transient operation.

15. The method of claim 12 wherein the step of transmitting data representative of the increase in notch setting comprises the step of transmitting the data from a locomotive main controller to a fuel injection controller, and the fuel injection controller in response transmits data relative to the fuel pressure, timing of a fuel injection during an engine cycle, the number of injections during an engine cycle or the duration of each fuel injection during the transient operation from the first notch setting to the second notch setting.

16. The method of claim 12 wherein the step of transmitting one or more commands comprises transmitting one or more commands relative to the timing of a fuel injection during an engine cycle, the number of injections during an engine cycle and the duration of each injection during an engine cycle and during the transient operation from the first notch setting to the second notch setting.

17. The method of claim 12 further comprising the steps of monitoring a fuel pressure in the fuel accumulator and transmitting to the fuel injection controller data relative to the fuel pressure detected in the accumulator.

18. The method of claim 17 further comprising the step of comparing the data relative to the fuel pressure detected in the accumulator to data relative to predetermined pressure levels or ranges of pressure levels during the transient operation, and the step of transmitting commands from the fuel injection controller comprises the step of transmitting a command indicative of increasing the fuel pressure in an engine cycle during the transient operation.

19. The method of claim 12 further comprising the step of transmitting data to the fuel injection controller, which data is relative to geographical coordinates of the engine, and comparing the geographical coordinate data to data in a database, which data contains geographical coordinates of passenger stations, and transmitting a signal from the fuel injection controller which signal is indicative of a command to make a plurality of fuel injections in an engine cycle during the transient operation.

20. The method of claim 19 wherein the step transmitting data representative of the increase in notch setting comprises detecting the physical movement of the throttle that reflects variation in notch setting and transmitting data representative of the variation in notch setting from an idle position to a first notch setting.

21. Computer readable media containing program instructions for controlling diesel engine smoke emissions and noise during a transient operation, wherein the engine has a high pressure fuel pump in fluid communication with a fuel reservoir and one or more fuel injectors and each of the fuel injectors is in fluid communication with a corresponding cylinder in which a piston is supported, and the one or more fuel injectors inject fuel into the cylinders responsive to commands, and wherein a throttle is drivingly coupled to the diesel engine, and the throttle is movable through discrete throttle notch settings wherein an operator of the engine changes a throttle position as required during operation of the engine, the computer media comprising:

a computer program for monitoring a parameter indicative of an increase in throttle notch setting from a first notch setting to a second notch setting;

a computer program for transmitting data representative of the increase in notch setting from a controller; and, a computer program for transmitting one or more commands from the controller relative to the fuel pressure, at which fuel is injected during the transient operation from the first notch setting to the second notch setting.

22. The computer readable media of claim 21 wherein the computer program for transmitting commands from the fuel injection controller comprises a computer program for transmitting a command indicative of an increasing fuel pressure during the transient operation.

23. The computer readable media of claim 21 wherein the computer program for transmitting commands from the fuel injection controller comprises a computer program for transmitting a command indicative of increasing the number of fuel injections in an engine cycle during the transient operation.

24. The computer readable media of claim 21 wherein computer program for transmitting data representative of the increase in notch setting comprises instructions for transmitting data representative of an increase in notch setting from an idle position to a first notch setting.

25. The computer readable media of claim 21 wherein computer program for transmitting data representative of the increase in notch setting comprises instructions for transmitting data representative of an increase in notch setting from a locomotive main controller to a fuel injector which transmits one or more commands from the controller relative to the fuel pressure, timing of a fuel injection during an engine cycle, the number of injections during an engine cycle or the duration of each fuel injection during the transient operation from the first notch setting to the second notch setting.

26. The computer readable media of claim 21 further comprising the computer program for monitoring a fuel pressure in the fuel accumulator and for transmitting to the fuel injection controller data relative to the fuel pressure detected in the accumulator.

27. The computer readable media of claim 26 further comprising a computer program for comparing the data relative to the fuel pressure detected in the accumulator to data relative to predetermined pressure levels or ranges of pressure levels during the transient operation, and the step of transmitting commands from the fuel injection controller comprises the step of transmitting a command indicative of increasing the fuel pressure in an engine cycle during the transient operation.

28. The computer readable media of 26 further comprising a computer program for transmitting data to the fuel injection controller, which data is relative to geographical coordinates of the engine, and comparing the geographical coordinate data to data in a database, which data contains geographical coordinates of passenger stations, and for transmitting a signal from the fuel injection controller which signal is indicative of a command to make a plurality of fuel injections in an engine cycle during the transient operation.

* * * * *